3,108,046
METHOD OF PREPARING HIGH DOSAGE SUSTAINED RELEASE TABLET AND PRODUCT OF THIS METHOD
Keith B. Harbit, Norristown, Pa., assignor to Smith Kline & French Laboratories, Philadelphia, Pa., a corporation of Pennsylvania
No Drawing. Original application Nov. 25, 1960, Ser. No. 71,394. Divided and this application Oct. 17, 1962, Ser. No. 231,278
12 Claims. (Cl. 167—82)

This invention relates to the method of making a high dosage sustained release orally administrable tablet and to the product of this method. More particularly. this invention provides a versatile, simplified method of preparing sustained release tablets with a high degree of control of the rate of drug release.

Prior to this invention various methods have been utilized to prepare sustained release tablets. These methods are restrictive in that they cannot be used except with drugs having certain physical properties. For example, the most popular method of preparing sustained release tablets is to disperse the drug in a sustained release material; such as for example, a wax. The wax is allowed to congeal and the very hard mass is screened through an appropriate screen size. There are several disadvantages associated with this method of preparing granulations. First it would be difficult and hazardous to adopt this molten wax technique to mass production. Aside from the hazard of working with large quantities of molten wax there is the difficulty of working with a very hard congealed drug-wax mixture which must be removed from the mixing vessel and milled. However, the most outstanding disadvantage of the prior art method of preparing sustained release tablets, in particular the molten wax process, is that a high dosage drug cannot easily be prepared with satisfactory release characteristics. A certain minimum quantity of wax is necessary to permit the drug to be suspended. This is especially true when a large amount of drug need be present due to the dose required and physical characteristic of the drug such as density. In a situation where high dosage drugs are needed a minimum amount of at least 30% of sustained release material would be needed to suspend the drug. This minimum amount of sustained release material is usually more than is required to provide the desired release rate and results in a slow release of the drug unless a larger amount of a disintegrating agent is also used. A further disadvantage is because of this erratic release rate the tablets prepared by the method of the prior art have necessitated the formulation of two groups of granulations. An immediate release granulation must be made to give an initial dose of the drug which was not available because of the large amount of wax present. Previously known high dosage prolonged action tablets have had either alternate layers of immediate and sustained release granulations or perhaps a core made of a sustained release granulation, via the molten wax procedure, surrounded by layers of immediate release material.

The method and tablet in accordance with this invention eliminates the above outlined disadvantages of the prior art sustained release tablets. The novel method as disclosed by the applicant permit a much smaller quantity of sustained release material to be used, especially with poorly water soluble, high dosage drugs, thus permitting a higher dose of drug per tablet. Another advantage of this novel invention is that by spraying the wax on the granulation it is possible to utilize a positive, effective quantity of sustained release material thereby achieving the desired release rate with lesser quantities of wax, i.e., again making it possible to incorporate more drug in each tablet. In contrast to the approximately 30% minimum amount of sustained release material needed in the prior art sustained release tablets, the applicant can use a minimum amount of 2% and get even release rates over a prolonged period of time.

Further, the method and tablet of this invention is markedly less expensive than the production of previously known prolonged action high dosage tablets. First, the desired release rates obtained by the more controlled method of applying the sustained release material gives the immediate initial dose without the necessity of preparing a separate immediate release layer. Secondly, this process also eliminates the added expense of utilizing special tablet machines necessary for compressing multilayered or press coated tablets. This invention utilizes a conventional rotary tablet press.

The method of this invention comprises preparing a granulation of the active medicament. The granulation is milled into granules and a sustained release lipid material is applied to the granules. The granules are then coated for example, by spraying a solution of the sustained release lipid material in a volatile solvent and then drying the granules. If desired a lubricant is then added to the coated granules and said granules are compressed into the desired size table.

The granulation may be prepared by any method wellknown to the art. For example, the medicament is wet with a binder in aqueous solution to form a granulation. The granulation is oven dried and the dried granulation is milled into granules having a size of from about 30 mesh to about 325 mesh. This type of granulation is known to the art as a wet granulation.

A second granulation technique which may be employed is by the dry granulation or "slugging" technique in which the medicament powder is compressed into a rough friable table which is in turn comminuted and sized as described above. These granulation techniques are thoroughly described in Remington's Practice of Pharmacy, 1956, pages 374–377. A third technique also wellknown to the art is formation of a granulation by spray drying or congealing techniques. Each of these granulation techniques may be particularly adaptable to the physical characteristics unique with the individual medicament employed.

The active ingredient may be any high dosage medicament. By a high dosage medicament is meant a solid medicament which is administered in a dosage amount of from about 0.300 g. to about 1.0 g. of medicament. Thus the tablet formed by this invention will contain from about 0.300 g. to about 1.0 g. of medicament. For example, the medicament may be a tranquilizer such as chlorpromazine; a diuretic such as aminophylline; a sedative such as secobarbital; an antibiotic such as tetracycline. Other types of medicaments can be employed in this novel process and tablet such as, for example, vitamins, hematinics, analgesics and antacids. The active ingredient may be present from about 30% to about 98% by weight of the granulation, the lower limit being dependent on the desired dosage of the drug. Advantageously the active ingredient will be from about 75% to about 98% of the granulation.

Most advantageously an antipyretic and analgetic such as aspirin is utilized as the high dosage medicament. Aspirin is undoubtedly one of the most widely used high dosage therapeutic agents having an adult dose from about 0.3 g. to about 1.0 g. repeated several times daily. The process and product of this invention would permit a high dose of aspirin and would provide a uniform sustained release of the aspirin in sufficient quantity to yield therapeutic activity.

In accordance with this invention the time delay material is a lipid material which is solid at room temperature, but has a low melting point of from 40° C. to 150° C. preferably 60° C. to 110° C. and is also nontoxic and pharmaceutically acceptable.

The time delay material is a substantially water insoluble material resistant to disintegration in the gastrointestinal tract and providing for a gradual release of the medicament in said tract. The time delay material may be, for example, a wax, a fatty acid, alcohol or ester, alone, or an admixture thereof.

The wax may be paraffin wax; a petrolatum wax; a mineral wax such as ozokerite, ceresin, utah wax or montan wax; a vegetable wax such as, for example, carnauba wax, Japan wax, bayberry wax, flax wax; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, ceryl palmitate, ceryl cerotate, myricyl mellissate, stearyl palmitate, stearyl myristate, lauryl laurate.

The fatty acid may have from 10 to 22 carbon atoms and may be, for example, decenoic, docosanoic, stearic, palmitic, lauric or myristic acid.

The fatty alcohols may have from 10 to 22 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, glyceryl tridecenoate, hydrogenated castor oil, hydrogenated peanut oil and hydrogenated coconut oil.

The preferred sustained release materials are hydrogenated castor oil, glyceryl monostearate, glyceryl distearate, 12 hydroxy stearyl alcohol and microcrystalline wax.

The sustained release coating material as outlined above is present from about 2 to 40% by weight of the total solids. Preferably the time delay material is present from about 5 to about 25%.

The pharmaceutically acceptable volatile solvent utilized in this process may be, for example, chloroform, carbon tetrachloride, trichloroethylene, petroleum ether, benzene, toluene, ethyl acetate, xylene, nitrobenzene, acetone, ether, carbon disulfide, methyl ethyl ketone and alcohols such as, methyl, ethyl and isopropyl alcohols.

The binder constituent used in the process of this invention is present from about 1 to about 20% by weight of the total solids. Preferably the binder is present from about 2 to about 10% by weight of the total solids. Exemplary of binders used are natural gums and gum constituents, cellulose esters, such as, for example, methyl cellulose and ethyl cellulose, polyvinyl alcohol, polyvinylpyrrolidone and proteinaceous material such as, for example gelatin, casein and zein. Advantageous binders are the natural gums and gum constituents, as for example acacia, tragacanth, agar and pectin.

When a lubricant is advantageously used it is present from about 0.5 to about 5% by weight of the total solids, preferably from about 1 to about 3% by weight of the total solids. Stearic acid, magnesium stearate, sodium stearate, calcium stearate, talc, sodium benzoate or combinations thereof are exemplary of lubricants which can be used in accordance with this invention.

It will be evident to one skilled in the art that the solvent, binder and lubricant are standard pharmaceutical tools used commonly in granulating methods and are not an essential aspect of this invention, therefore they can be varied broadly.

The final tableted product comprises coated granules compressed into tablet form which provide both an immediate release and a sustained release of the medication, providing a smooth 8 hour release pattern which yields therapeutic activity from 10 to 12 hours. The immediate dose represents approximately one third of the total dose with the remaining two thirds being released over the eight hour period. The tablet can comprise of many shapes such as, for example, cylindrical flat face, oval, spherical, capsule shape, heart shape, triangular and flat face.

The invention will be further clarified by the following specific examples.

Example 1

Ingredients: Amounts
Tetracycline hydrochloride _____kilograms__ 7.5
Gelatin solution 10%.
Glyceryl tristearate _____do____ 1.9
Carbon tetrachloride _____liters__ 10.0
Magnesium stearate _____kilograms__ 0.09

The 10% gelatin solution is added to the tetracycline hydrochloride to form a granulation. The granulation is dried overnight at about 120° F. and the resulting material is milled in a comminuting machine and passed through a #30 U.S. Standard Mesh Sieve. The resulting granules are placed in a coating pan and sprayed with carbon tetrachloride solution of glyceryl tristearate. The coated granules are tray dried overnight at room temperature, mixed with the magnesium stearate and compressed into tablets having a total weight of 950 mg. per tablet.

Example 2

Ingredients: Amounts
Chloropromazine hydrochloride __kilograms__ 8.07
Water-alcohol #30 (denaturated-1:1 mixture).
Glyceryl distearate _____kilograms__ 1.43
Carbon tetrachloride _____liters__ 7.00

The water-alcohol mixture is added to the chloropromazine hydrochloride to form a granulation. The granulation is dried overnight at about 120° F. The resulting material is milled in a comminuting machine and passed through a #30 U.S. Standard Mesh Sieve. The resulting fine granules are coated in a coating pan with a hot carbon tetrachloride solution of glyceryl distearate which was previously heated to about 63° C. The coated granules are then tray dried overnight at room temperature. The dried, coated granules are then tableted in 950 mg. tablets.

Example 3

Ingredients: Amounts
Aspirin _____kilograms__ 8.20
Alcoholic solution of polyvinylpyrrolidone.
Hydrogenated castor oil _____kilograms__ 0.17
Petroleum ether _____liters__ 1.70
Stearic acid _____kilograms__ 0.05

The alcoholic polyvinylpyrrolidone solution is added to the aspirin and thoroughly mixed to form a granulation. The granulation is dried overnight at about 120° F. The resulting material is milled in a comminuting machine and sieved through a #30 U.S. Standard Mesh Sieve. The resulting fine granules are placed in a coating pan and coated by spraying with a petroleum ether solution of hydrogenated castor oil. The coated granules are then tray dried overnight at room temperature. The dried coated granules are then mixed with the stearic acid and compressed into tablets having a total weight of 950 mg.

*Example 4*

Ingredients: Amounts
- Aminophylline ---------------- kilograms-- 10.0
- Acacia, USP ---------------------- do---- 0.5
- Hydrogenated castor oil------------- do---- 1.6
- Chloroform ---------------------- liters-- 16.0

The aminophylline and acacia are mixed together and water added to the mixing powders to form a granulation. The granulation is dried overnight at about 120° F. The resulting material is milled in a comminuting machine and passed through a #30 U.S. Standard Mesh Sieve. The milled granules are sprayed with a chloroform solution of hydrogenated castor oil in a coating pan, and then dried overnight on trays at room temperature. The dried, coated granules are then tableted in 750 mg. tablets.

*Example 5*

Ingredients: Amounts
- Aspirin, USP (powdered) ------------- gm-- 3,000
- Hydrogenated castor oil------------- gm-- 60
- Magnesium stearate---------------- gm-- 30
- Chloroform ---------------------- ml-- 540

The aspirin powder is compressed with high pressure compaction using a Stokes Model "T" Tablet Press using a one inch diameter flat faced punch. The compacted aspirin is ground in a Stokes Oscillating granulator and then passed through a #30 U.S. Standard Mesh Sieve to obtain sized granules. The aspirin granules are placed in a coating pan which is set in motion. The hydrogenated castor oil is dissolved in chloroform and sprayed onto the rotating aspirin granules. After all of the hydrogenated castor oil is applied, the coated granules are dried to remove all traces of chloroform. After drying, the granules are passed through a #16 U.S. Standard Mesh Sieve. The magnesium stearate is aded to the coated granules which are mixed well, and compressed into tablets containing 650 mg. aspirin per tablet using conventional tablet press such as a Stokes Model "E" Tablet Press.

If desired a second layer or coating of standard immediate release aspirin may be compressed onto the aspirin tablet, such as by press coating, to give a larger initial release of drug.

This application is a continuing application based on application Serial No. 71,394, filed November 25. 1960, now abandoned.

What is claimed is:

1. The method of preparing a sustained release orally administrable pharmaceutical product of high dosage comprising wetting a powdered high dosage medicament with a binder and granulating the thus wetted medicament to form granules, the medicament being present in an amount of up to about 97% by weight of said granules, drying the granules, milling the dried granules to a size of from about 30 mesh to about 325 mesh, pan coating substantially completely the milled granules with from about 2% to about 40% by weight of a pharmaceutically acceptable sustained release lipid material resistant to disintegration and slowly dispersible in the gastrointestinal tract to form granules substantially completely coated with said lipid material.

2. The method of preparing a sustained release orally administrable pharmaceutical product of high dosage comprising wetting a powdered high dosage medicament with a binder and granulating the thus wetted medicament to form granules, the medicament being present in an amount of up to about 98% by weight of said granules, drying the granules, milling the dried granules to a size of from about 30 mesh to about 325 mesh, pan coating substantially completely the milled granules with from about 2% to about 40% by weight of a pharmaceutically acceptable sustained release lipid material resistant to disintegration and slowly dispersible in the gastrointestinal tract to form granules substantially completely coated with said lipid material, admixing the coated granules with up to about 5% by weight of a tablet lubricant and compressing the thus formed mixture of coated granules and lubricant into a tablet.

3. The method in accordance with claim 2 characterized in that the lipid material is selected from the group consisting of hydrogenated castor oil. 12-hydroxy stearyl alcohol, glyceryl monostearate, glyceryl distearate and microcrystalline wax.

4. The method in accordance with claim 2 characterized in that the medicament is aspirin.

5. The method in accordance with claim 2 characterized in that the medicament is tetracycline.

6. A high dosage sustained release orally administrable pharmaceutical product made in accordance with claim 1.

7. A high dosage sustained release orally administrable pharmaceutical tablet made in accordance with claim 2.

8. The method of preparing a sustained release orally administrable pharmaceutical product of high dosage comprising granulating a powdered high dosage medicament to form granules, the medicament being present in an amount of up to about 98% by weight of said granules, milling the granules to a size of from about 30 mesh to about 325 mesh, pan coating substantially completely the milled granules with from about 2% to about 40% by weight of a pharmaceutically acceptable sustained release lipid material resistant to disintegration and slowly dispersible in the gastrointestinal tract to form granules substantially completely coated with said lipid material, admixing the coated granules with up to about 5% by weight of a tablet lubricant and compressing the thus formed mixture of coated granules and lubricant into a tablet.

9. The method of preparing a sustained release orally administrable pharmaceutical product of high dosage comprising slugging a powdered high dosage medicament into a friable tablet, breaking said friable tablet into granules, sizing the granules to a size of from about 30 mesh to about 325 mesh, pan coating substantially completely the sized granules with from about 2% to about 40% by weight of a pharmaceutically acceptable sustained release lipid material resistant to disintegration and slowly dispersible in the gastrointestinal tract to form granules substantially completely coated with said lipid material, admixing the coated granules with up to about 5% by weight of a tablet lubricant and compressing the thus formed mixture of coated granules and lubricant into a tablet.

10. The method in accordance with claim 9 characterized in that the medicament is aspirin.

11. The method in accordance with claim 9 characterized in that the lipid material is selected from the group consisting of hydrogenated castor oil, 12-hydroxy stearyl alcohol, glyceryl monosterate, glyceryl disteartee and microcrystalline wax.

12. A high dosage sustained release orally administrable pharmaceutical tablet made in accordance with claim 9.

References Cited in the file of this patent

UNITED STATES PATENTS 2,540,979    Clymer et al. ----------- Feb. 6, 1951

(Other references on following page)

UNITED STATES PATENTS

| | | |
|---|---|---|
| 2,652,805 | D'Angelo | Sept. 22, 1953 |
| 2,736,288 | Clay et al. | Feb. 28, 1956 |
| 2,738,303 | Blythe | Mar. 13, 1956 |
| 2,793,979 | Svedres et al. | May 28, 1957 |
| 2,798,443 | Martell | July 9, 1957 |
| 2,798,838 | Robinson | July 9, 1957 |
| 2,805,977 | Robinson et al. | Sept. 10, 1957 |
| 2,851,453 | Kennon et al. | Sept. 9, 1958 |
| 2,875,130 | Grass et al. | Feb. 24, 1959 |
| 2,877,438 | Cooper et al. | May 19, 1959 |
| 2,895,880 | Rosenthal | July 21, 1959 |
| 2,921,883 | Reese et al. | Jan. 19, 1960 |
| 2,951,792 | Swintosky | Sept. 6, 1960 |
| 2,956,926 | Grief | Oct. 18, 1960 |
| 2,971,889 | Swintosky | Feb. 14, 1961 |
| 2,986,475 | Mesnard et al. | May 30, 1961 |

FOREIGN PATENTS

| | | |
|---|---|---|
| 628,600 | Canada | Oct. 3, 1961 |